(12) United States Patent
Yoshikawa et al.

(10) Patent No.: US 9,964,017 B2
(45) Date of Patent: May 8, 2018

(54) PARTICULATE COLLECTION SYSTEM AND PARTICULATE COLLECTION APPARATUS

(71) Applicant: NGK SPARK PLUG CO., LTD., Nagoya-shi, Aichi (JP)

(72) Inventors: Takaya Yoshikawa, Kasugai (JP); Hiroyuki Suzuki, Kasugai (JP); Kentaro Mori, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days. days.

(21) Appl. No.: 15/047,824

(22) Filed: Feb. 19, 2016

(65) Prior Publication Data

US 2016/0251994 A1    Sep. 1, 2016

(30) Foreign Application Priority Data

Feb. 26, 2015 (JP) .................................. 2015-036509
Mar. 11, 2015 (JP) .................................. 2015-048054

(51) Int. Cl.
| | | |
|---|---|---|
| *F01N 9/00* | (2006.01) | |
| *F01N 3/027* | (2006.01) | |
| *F01N 3/031* | (2006.01) | |
| *F01N 3/10* | (2006.01) | |

(52) U.S. Cl.
CPC ............ *F01N 9/002* (2013.01); *F01N 3/0275* (2013.01); *F01N 3/031* (2013.01); *F01N 3/101* (2013.01); *F01N 2410/04* (2013.01); *F01N 2550/12* (2013.01); *F01N 2900/08* (2013.01); *F01N 2900/1602* (2013.01); *Y02T 10/22* (2013.01); *Y02T 10/47* (2013.01)

(58) Field of Classification Search
CPC ........ F01N 9/002; F01N 3/0275; F01N 3/031; F01N 3/10; F01N 3/101; F01N 3/106; F01N 2900/08

See application file for complete search history.

(56) References Cited

U.S. PATENT DOCUMENTS

| | | | | |
|---|---|---|---|---|
| 4,512,147 A | * | 4/1985 | Wong ...................... | F01N 3/021 55/283 |
| 4,538,411 A | * | 9/1985 | Wade ...................... | F01N 3/027 55/283 |
| 5,085,049 A | * | 2/1992 | Rim ......................... | F01N 3/02 55/466 |

(Continued)

FOREIGN PATENT DOCUMENTS

JP    2010-261423 A    11/2010

*Primary Examiner* — Patrick Maines
(74) *Attorney, Agent, or Firm* — Stites & Harbison, PLLC; Jeffrey A. Haeberlin; James R. Hayne

(57) ABSTRACT

A particulate collection system collects particulates contained in exhaust gas discharged from an internal combustion engine. The particulate collection system includes a first particulate collection filter; a second particulate collection filter capable of storing or radiating heat; a heating member for heating the second particulate collection filter; and a control section which selectively executes collection of particulates by the first particulate collection filter, collection of particulates by the first particulate collection filter and the second particulate collection filter, and heating of the second particulate collection filter by the heating member.

10 Claims, 12 Drawing Sheets

(56) References Cited

U.S. PATENT DOCUMENTS

| | | | | |
|---|---|---|---|---|
| 5,489,319 | A * | 2/1996 | Tokuda | F01N 3/027 55/282.3 |
| 5,822,977 | A * | 10/1998 | Fukuda | B01D 53/944 60/274 |
| 2002/0194842 | A1 * | 12/2002 | Minami | B01D 53/9477 60/288 |
| 2003/0110761 | A1 * | 6/2003 | Minami | B01D 53/9431 60/280 |
| 2015/0300247 | A1 * | 10/2015 | Minami | F02D 19/10 123/27 GE |
| 2015/0315986 | A1 * | 11/2015 | Minami | F01N 3/035 60/274 |
| 2016/0250592 | A1 * | 9/2016 | Yoshikawa | B01D 53/9431 422/111 |
| 2016/0251993 | A1 * | 9/2016 | Yoshikawa | F01N 3/027 60/284 |

* cited by examiner

PARTICULATE COLLECTION SYSTEM AND PARTICULATE COLLECTION APPARATUS

CROSS REFERENCE TO RELATED APPLICATIONS

The present application claims priority to Japanese Patent Application Nos. 2015-036509 and 2015-048054, which were filed on Feb. 26, 2015 and Mar. 11, 2015, respectively, the disclosure of which are herein incorporated by reference in their entirety.

BACKGROUND OF THE INVENTION

Field of the Invention

The present invention relates to a particulate collection system and a particulate collection apparatus which are disposed in an exhaust pipe passage of an internal combustion engine.

Description of Related Art

In order to cope with recent regulations on the components of emission gas (exhaust gas) of an internal combustion engine, various types of exhaust gas purification units are disposed in the exhaust pipe passage of the internal combustion engine. These exhaust gas purification units purify the exhaust gas components such as NOx and PM (particulate matter) through chemical reaction between a chemical substance such as catalyst or urea water and the exhaust gas components, and the chemical substance exhibits an optimum purification performance in a certain temperature range (see, for example, Patent Document 1).

RELATED ART DOCUMENTS

Patent Document 1 is Japanese Patent Application Laid-Open (kokai) No. 2010-261423.

BRIEF SUMMARY OF THE INVENTION

However, in the case of a diesel engine, the generation amounts of NOx and PM tend to increase at the time of acceleration and at the time of high load. Therefore, a PM purification unit, for example, a diesel particulate filter (DPF), must be designed on the basis of the amount of PM generated at the time of acceleration, or a process of regenerating the DPF must be performed frequently. In the case where the PM purification unit is designed on the basis of the PM generation amount at the time of acceleration, a problem arises in that the size of the PM purification unit becomes large as compared with the frequency at which the PM purification unit becomes necessary. Particularly, a plasma DPF which removes PM using low-temperature plasma has problems in that a circuit required to generate plasma becomes larger and a larger amount of electric power is consumed. Also, the DPF regeneration process raises a problem in that frequent DPF regeneration increases the rate of fuel consumption because the regeneration process consumes fuel.

Accordingly, efficient purification of exhaust gas has been desired.

The present invention has been accomplished so as to solve the above-described problem and can be realized as the following modes.

A first mode provides a particulate collection system for collecting particulates contained in exhaust gas discharged from an internal combustion engine. The particulate collection system according to the first mode comprises a first particulate collection filter; a second particulate collection filter; a heating member for heating the second particulate collection filter; and a control section configured to selectively execute collection of particulates by the first particulate collection filter, collection of particulates by the first particulate collection filter and the second particulate collection filter, and heating of the second particulate collection filter by the heating member.

The particulate collection system according to the first mode can efficiently purify the exhaust gas.

In the particulate collection system according to the first mode, the heating member may generate heat using electric power obtained through regeneration and regenerate the second particulate collection filter. In this case, it is possible to cause the heating member to generate heat to thereby regenerate the second particulate collection filter without lowering the overall energy efficiency of the vehicle.

In the particulate collection system according to the first mode, the particulate collection system may be disposed in a stage before an exhaust gas purification unit disposed in an exhaust pipe passage of the internal combustion engine. In this case, in the case where heat is stored in the second particulate collection filter, it is possible to heat the exhaust gas by the heat stored in the second particulate collection filter, and adjust the temperature of the exhaust gas purification unit to a proper operating temperature range or assist the adjustment through use of the heated exhaust gas.

In the particulate collection system according to the first mode, the exhaust gas purification unit may be a selective catalytic reduction unit, a three-way catalyst, or an oxidation catalyst. In this case, in the case where heat is stored in the second particulate collection filter, it is possible to heat the exhaust gas by the heat stored in the second particulate collection filter, and adjust the temperature of the selective catalytic reduction unit, the three-way catalyst, or the oxidation catalyst to a proper operating temperature range or assist the adjustment through use of the heated exhaust gas.

The particulate collection system according to the first mode may further comprise a first flow passage for the exhaust gas (i.e., the first flow passage serves as a flow passage for the exhaust gas), the first flow passage containing the second particulate filter; a second flow passage for the exhaust gas (i.e., the second flow passage serves as a flow passage for the exhaust gas) which differs from the first flow passage; and a changeover section which leads the exhaust gas to either one of the first flow passage or the second flow passage (i.e., the changeover section switches the flow passage for the exhaust gas to either one of the first flow passage or the second flow passage), wherein the first particulate collection filter is disposed in a stage before or after the first flow passage and the second flow passage, and the control section selectively executes the collection of particulates by the first particulate collection filter, the collection of particulates by the first particulate collection filter and the second particulate collection filter, and the heating of the second particulate collection filter by the heating member by controlling the changeover section. In this case, the collection of particulates by the second particulate collection filter can be selectively performed by switching the exhaust gas flow passage between the flow passage in which the second particulate collection filter is disposed and the flow passage in which the second particulate collection filter is not disposed.

In the particulate collection system according to the first mode, the control section may switch the changeover section to lead the exhaust gas to the first flow passage when load of the internal combustion engine is above a predetermined range, and the control section switches the changeover section to lead the exhaust gas to the second flow passage and causes the heating member to generate heat when the load of the internal combustion engine is below the predetermined range. In this case, particulates which are produced greatly when the load of the internal combustion engine is greater than the load within the predetermined range are collected by the second particulate collection filter, and the second particulate collection filter can be regenerated when the load of the internal combustion engine is less than the load within the predetermined range.

In the particulate collection system according to the first mode, the control section may switch the changeover section to lead the exhaust gas to the second flow passage when the load of the internal combustion engine falls within the predetermined range. In this case, particulates can be collected by the first particulate collection filter.

A second mode provides a particulate collection apparatus disposed in an exhaust pipe passage of an internal combustion engine. The particulate collection apparatus according to the second mode comprises an introduction opening for introducing exhaust gas from the internal combustion engine; a discharge opening for discharging the introduced exhaust gas; a first particulate collection filter disposed at the introduction opening or the discharge opening; a first flow passage establishing communication between the introduction opening and the discharge opening; a second particulate collection filter disposed in the first flow passage, the second particulate collection filter capable of storing or radiating heat; a heating member disposed in the first flow passage; a second flow passage which differs from the first flow passage, the second flow passage establishing communication between the introduction opening and the discharge opening; and a changeover section configured to lead the exhaust gas to either one of the first flow passage or the second flow passage (i.e., the changeover section switches a flow passage, through which the exhaust gas flows, to either one of the first flow passage or the second flow passage).

The particulate collection apparatus according to the second mode can efficiently purify the exhaust gas.

In the particulate collection apparatus according to the second mode, the heating member and the second particulate collection filter may be integrally formed. In this case, the efficiency of the operation of storing heat in the second particulate collection filter through use of the heating member can be improved.

The particulate collection apparatus according to the second mode may further comprise a second heating member disposed at the discharge opening. In this case, the shortage of heat which occurs as a result of heating by the second particulate collection filter only can be supplemented by the heat generated by the second heating member.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

Figure 1:
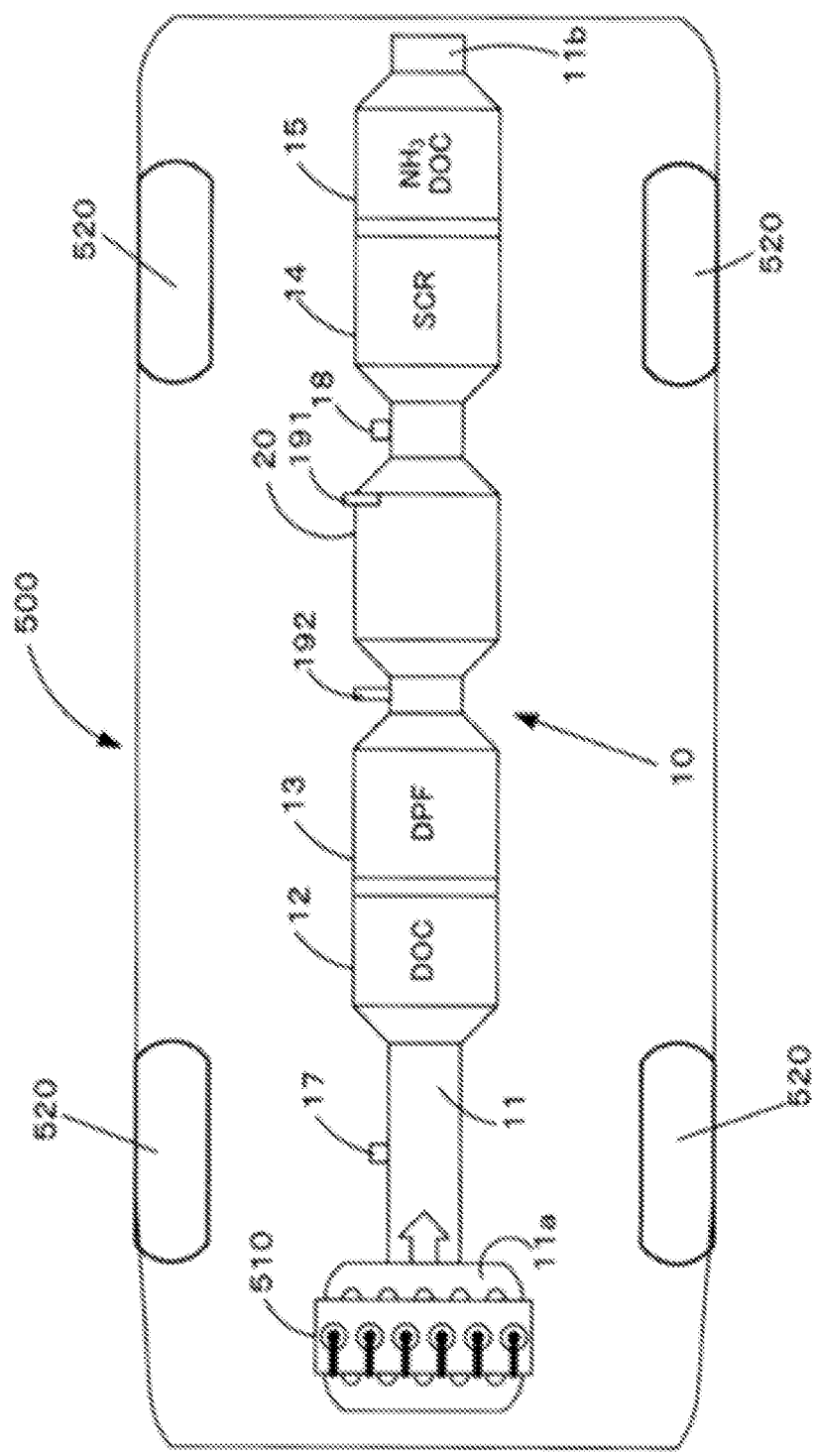
FIG. 1 is an explanatory view schematically showing a vehicle including a particulate collection system used in a first embodiment.

One mode of a particulate collection system according to the present invention will now be described by taking as an example a vehicle including a diesel engine (internal combustion engine). FIG. 1 is an explanatory view schematically showing a vehicle having a particulate collection system used in a first embodiment.

A. First Embodiment

A vehicle 500 includes a diesel engine (hereafter referred to as the "engine") 510, four wheels 520, and a particulate collection system 10. The engine 510 uses light oil as fuel and outputs drive force by means of explosive combustion of the fuel. Also, as a result of the explosive combustion, the engine 510 discharges exhaust gas containing NOx (nitrogen oxides) and PM (particulate matter) to the atmosphere through the particulate collection system 10 provided in the exhaust system of the vehicle 500. Notably, the configuration of the vehicle shown in FIG. 1 and used in the first embodiment can be used similarly in other embodiments.

The particulate collection system 10 includes various types of exhaust gas purification units provided on an exhaust pipe 11 (exhaust pipe passage). The exhaust pipe 11 is connected to the engine 510 through a manifold 11a on the side toward the engine 510 (on the upstream side with respect to the flow direction of the exhaust gas), and has a muffler end pipe 11b on the furthest downstream side with respect to the flow direction of the exhaust gas. The particulate collection system 10 includes a diesel oxidation catalyst (DOC) 12, a diesel particulate filter (DPF) 13, a particulate collection apparatus 20, a selective catalytic reduction (SCR) unit 14, and an ammonia slip diesel oxidation catalyst ($NH_3$ DOC) 15 which are provided on the exhaust pipe 11 in this order from the upstream side with respect to the flow direction of the exhaust gas. A fuel injection unit 17 may be disposed on the exhaust pipe 11 to be located upstream of the DOC 12, and a urea water injection unit 18 is disposed upstream of the SCR unit 14. A first temperature sensor 191 is disposed on the particulate collection apparatus 20, and a second temperature sensor 192 is disposed upstream of the particulate collection apparatus 20. The first temperature sensor 191 may be disposed on the upstream side or downstream side of the particulate collection apparatus 20. The second temperature sensor 192 may be disposed at any location where it can detect the temperature of the exhaust gas introduced into the particulate collection apparatus 20, for example, on the downstream side (outlet side) of the DPF 13. Notably, the expression "on the exhaust pipe" in the present embodiment encompasses both the case where a relevant unit or the like is provided inside the exhaust pipe and in the case where a relevant unit or the like is provided in the midway of the exhaust pipe (a relevant unit or the like constitutes a portion of the exhaust pipe).

The diesel oxidation catalyst 12 carries a noble metal such as platinum (Pt), palladium (Pd), or the like as a catalyst. The diesel oxidation catalyst 12 oxidizes carbon monoxide (CO) and hydrocarbon (HC) which are unburned gas components contained in the exhaust gas and convert them to carbon dioxide ($CO_2$) and water ($H_2O$), and oxides nitrogen monoxide (NO) contained in the exhaust gas and coverts it to nitrogen dioxide ($NO_2$).

The diesel particulate filter 13 is a filter which collects the particulates (PM) contained in the exhaust gas by a porous ceramic or metallic member having fine pores or openings (holes). Broadly speaking, the diesel particulate filter 13 is one mode of the exhaust gas purification unit. However, in the present invention, attention is paid to the PM collection function of the diesel particulate filter 13, and the diesel particulate filter 13 is regarded as a first particulate collection filter. A metal catalyst such as platinum or the like is applied to the surface of the porous member. The diesel particulate filter 13 is naturally regenerated as follows. In the presence of NOx produced by the diesel oxidation catalyst 12, the particulate matter chemically reacts with the catalyst in an atmosphere of 250 to 300° C. and is converted to carbon dioxide ($CO_2$) and water ($H_2O$), whereby the diesel particulate filter 13 is regenerated. The diesel particulate filter 13 can be regenerated by means of forced regeneration as well. Specifically, fuel is supplied to the diesel oxidation catalyst 12 directly through the fuel injection unit 17 or indirectly from the engine 510 in the exhaust stroke, and hydrocarbon originating from the fuel is catalytically combusted so as to increase the temperature of the exhaust gas to 450° C. or higher, whereby the collected particulate mater is oxidized. Thus, the diesel particulate filter 13 is regenerated.

Notably, the DPF 13 may be a DPF of a type which physically collects the particulate matter and oxidizes the particulate matter by catalytic combustion of hydrocarbon or a plasma DPF which includes a plasma generation unit for generating low-temperature plasma to thereby generate active species (mainly $O_3$) and which supplies the generated active species to the PDF and converts (oxidizes) the components of the particulate matter such as HC and C to $H_2O$ and $CO_2$. Since the plasma DPF can oxidize the particulate matter without using fuel and does not collect the particulate matter physically (by a physical shape), there has been demanded to design the plasma generation unit such that it can generate active species in an amount corresponding to the amount of particulate matter to be processed in advance.

The selective catalytic reduction (SCR) unit 14 is an apparatus which carries a zeolite-based catalyst or a vanadium-based catalyst and selectively reduces NOx. In general, the selective catalytic reduction unit 14 operates as follows. Urea water is sprayed on the exhaust gas by the urea water injection unit 18 at a location before the inlet of the selective catalytic reduction unit 14. The selective catalytic reduction unit 14 produces ammonia ($NH_3$) through thermal decomposition of the urea water and hydrolysis reaction, and converts the NOx component of the exhaust gas to nitrogen ($N_2$) and water ($H_2O$). Accordingly, at the location before the inlet of the selective catalytic reduction unit 14, the exhaust gas must have a proper temperature (for example, 200° C. or higher) in order to obtain ammonia from the urea water.

The ammonia slip diesel oxidation catalyst 15 carries the same catalyst as the diesel oxidation catalyst 12. The ammonia slip diesel oxidation catalyst 15 oxidizes and decomposes ammonia not used for the reaction at the selective catalytic reduction unit 14 to thereby produce nitrogen or NOx.

Figure 2:
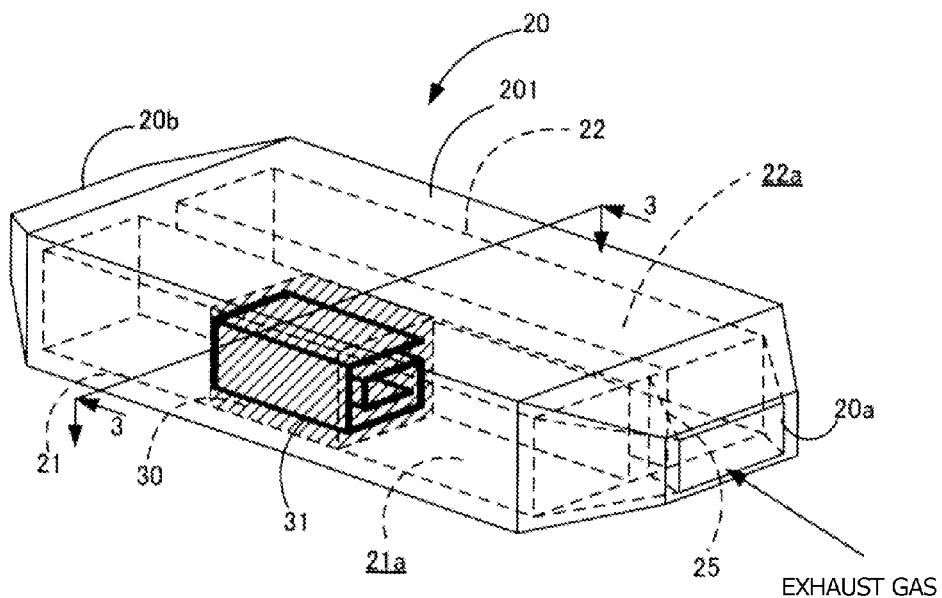
FIG. 2 is an external perspective view schematically showing the structure of a particulate collection apparatus according to the first embodiment.
Figure 3:
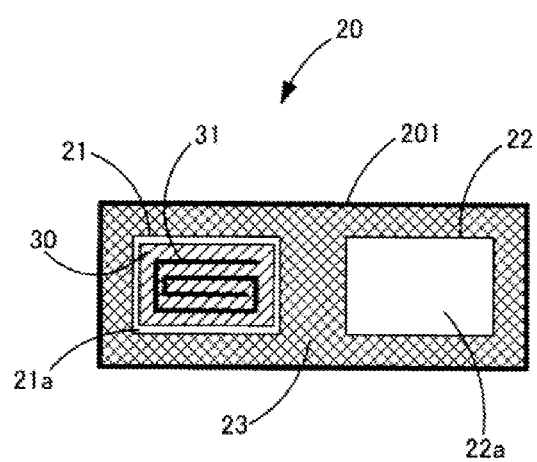
FIG. 3 is a schematic transverse cross-sectional view of the particulate collection apparatus according to the first embodiment taken along line 3-3 shown in FIG. 2.

The particulate collection apparatus 20 used in the particulate collection system 10 according to the first embodiment will now be described in detail. FIG. 2 is an external perspective view schematically showing the structure of the particulate collection apparatus according to the first embodiment. FIG. 3 is a schematic transverse cross-sectional view of the particulate collection apparatus according to the first embodiment taken along line 3-3 shown in FIG. 2.

The particulate collection apparatus 20 includes a casing 201 (housing), a first flow passage pipe 21, a second flow passage pipe 22, a heat reservoir 30, a heating member 31, a heat insulating material 23, and a flow passage changeover valve 25. Notably, in the present embodiment, a particulate collection filter which is high in heat storing and radiating performance is used and is referred to as the heat reservoir 30. However, in the case where a particulate collection filter which does not have heat storing and radiating performance or is low in heat storing and radiating performance is used, it may be simply referred to as a particulate collection filter. The casing 201 is formed of stainless steel or steel sheet with oxidation prevention treatment performed thereon. The first flow passage pipe 21 defines a first flow passage 21a through which the exhaust gas flows, and the second flow passage pipe 22 defines a second flow passage 22a through which the exhaust gas flows. The first flow passage pipe 21 and the second flow passage pipe 22 are disposed in parallel to each other. The casing 201 has an introduction opening 20a for introducing the exhaust gas into the inside of the casing 201 and a discharge opening 20b for discharging the exhaust gas to the outside. The introduction opening 20a communicates with the first flow passage pipe 21 and the second flow passage pipe 22, and the discharge opening 20b communicates with the first flow passage pipe 21 and the second flow passage pipe 22. Although the first flow passage pipe 21 and the second flow passage pipe 22 have the shape of a hollow parallelepiped, they may have a cylindrical shape or any other shape.

On one side of the casing 201 where the introduction opening 20a is provided, the flow passage changeover valve 25 is provided so as to switch the flow passage pipe through which the exhaust gas flows, between the first flow passage pipe 21 and the second flow passage pipe 22. The flow passage changeover valve 25 may be a changeover valve in which selective switching between the flow passages is realized by swing motion of a plate-shaped valve body about a shaft provided at one end of the valve body as shown in the drawings, a changeover valve in which selective switching between the flow passages is realized by rotation of a rotary valve body about its axis, the rotary valve body having communication passages formed therein, or a changeover valve in which selective switching between the flow passages is realized by straight movement of a plate-shaped valve body. Examples of an actuator for driving the valve body include a motor such as a stepping motor, an electromagnetic actuator, and an actuator using fluid such as air or oil. Notably, as will be described later, there exist cases where the switching between the flow passages is not required to be selective; i.e., exclusive. In such a case, the flow passage changeover valve 25 is required to introduce the exhaust gas, introduced through the introduction opening 20a, to both of the first and second flow passage pipes 21 and 22. The flow passage changeover valve 25 may be provided for each of the flow passage pipes 21 and 22. In this case, it is possible to close one flow passage pipe and adjust the flow rate of the exhaust gas flowing through the other flow passage pipe. Namely, the exhaust gas flow rates at the two flow passage pipes can be controlled independently.

The heat reservoir 30 is disposed inside the first flow passage pipe 21 to partially occupy the interior of the flow passage pipe 21. Although the heat reservoir 30 has a rectangular parallelepipedic shape corresponding to the shape of the first flow passage pipe 21, the heat reservoir 30 may have a circular columnar shape or any other shape. The heat reservoir 30 may be any of a ceramic member, a sintered body of metal powder, a metal honeycomb, an expanded metal, and the like each of which has internal flow passages through which the exhaust gas can flow. In the present embodiment, the heat reservoir 30 also functions as a second particulate collection filter for collecting the particulates (PM). Therefore, the heat reservoir 30 has pores, perforations, openings, protrusions, etc. which function as a particulate collection portion for collecting particulates. Notably, the internal flow passages may be intentionally formed flow passages (for example, straight flow passages) or flow passages (for example, meandering flow passages) formed by openings formed due to the property of the material. Also, depending on the required heat capacity or PM collection amount, the heat reservoir 30 may be disposed in the first flow passage pipe 21 such that the heat reservoir 30 occupies the entire internal space of the first flow passage pipe 21.

The heating member (heater) 31 is embedded in the heat reservoir 30. In the example shown in FIGS. 2 and 3, since the first flow passage pipe 21 has a rectangular parallelepipedic shape and the heat reservoir 30 also has a parallelepipedic shape corresponding thereto, the heating member 31 has a shape having a rectangular spiral cross section. However, the heating member 31 may have a shape having a circular spiral cross section. Since the heating member 31 is used to store heat in the heat reservoir 30 or combust the particulates (PM) collected by the heat reservoir 30, the heating member 31 may be partially or entirely embedded in the heat reservoir 30, or may be disposed near or joined to a portion or the entirety of the outer peripheral surface of the heat reservoir 30. The heating member 31 may be a heating member which is formed by stacking a plurality of flat or corrugated metal plates, or flat and corrugated metal plates, in such a manner that they are spaced from one another and in which the plates themselves generate heat upon energization. In this case, it is desired that holes be formed in the metal plates or irregularities be formed on the metal plates in order to increase their heat generation surface areas. A plurality of heating members each of which has a rod-like shape and which are inserted into the internal flow passages of the heat reservoir 30 to extend along the flow direction of the exhaust gas may be used as the heating member 31. Notably, the heating member in the present embodiment may be a resistance heating element (heat generation member) whose periphery is not covered with an insulating material and which itself generates heat when electricity is supplied thereto. For example, the heating member may be a wire-shaped heating member such as Nichrome wire, copper wire, or tungsten wire. Alternatively, the heating member 31 may be a plate-shaped bare metallic member formed of, for example, stainless steel, cupper, or aluminum. Alternatively, the heating member 31 may be formed of non-metallic material (e.g., silicon carbide, carbon, etc.) which is small in heat capacity and does not function well as a heat reservoir. Alternatively, the heating member 31 may be a heating member which includes a resistance heating element disposed within a casing and covered with powder of an inorganic insulating material such as magnesia; i.e., the heating member 31 may be a heating member generally called "heater."

Notably, the heating member 31 may be used as a heat reservoir without separately providing the heat reservoir 30. For example, in the case where the heating member 31 has a form having a spiral cross section as a result of stacking of plates or has a rectangular three-dimensional shape as a result of stacking of plates, since each metal plate can function as a sensible heat storage member, the heating member 31 functions as a heat reservoir 30 having a predetermined heat capacity. In addition, as a result of hole formation processing or irregularity formation processing on each plate, the heating member 31 also functions as a particulate collection filter. Therefore, the heating member 31 can realize PM collection by the heat reservoir. The separating spaces between the stacked plates can function as internal flow passages and also function as a particulate collection portion.

Further, the heating member 31 is not required to be embedded in the heat reservoir 30 and may be disposed at least on the upstream side (the engine side) or the downstream side of the heat reservoir 30 to be located near the heat reservoir 30. Namely, no limitation is imposed on the position of the heating member 31 so long as the heating member 31 can heat the heat reservoir 30 and causes the heat reservoir 30 to store heat.

The heat insulating material 23 is disposed or charged in the space between the casing 201 and the first flow passage pipe 21 and the second flow passage pipe 22. For example, a sheet material formed of ceramic, a cylindrical hard ceramic material, or a foamable ceramic material is used as the heat insulating material 23. As a result of provision of the heat insulating material 23, the amount of heat conducted to the metallic casing 201 can be reduced, and the heat insulating efficiency of the particulate collection apparatus 20 can be maintained at a desired level. Notably, in order to further improve the heat insulation property, the casing 201 may have a double wall structure in which a layer of air is provided between the two walls.

Figure 4:
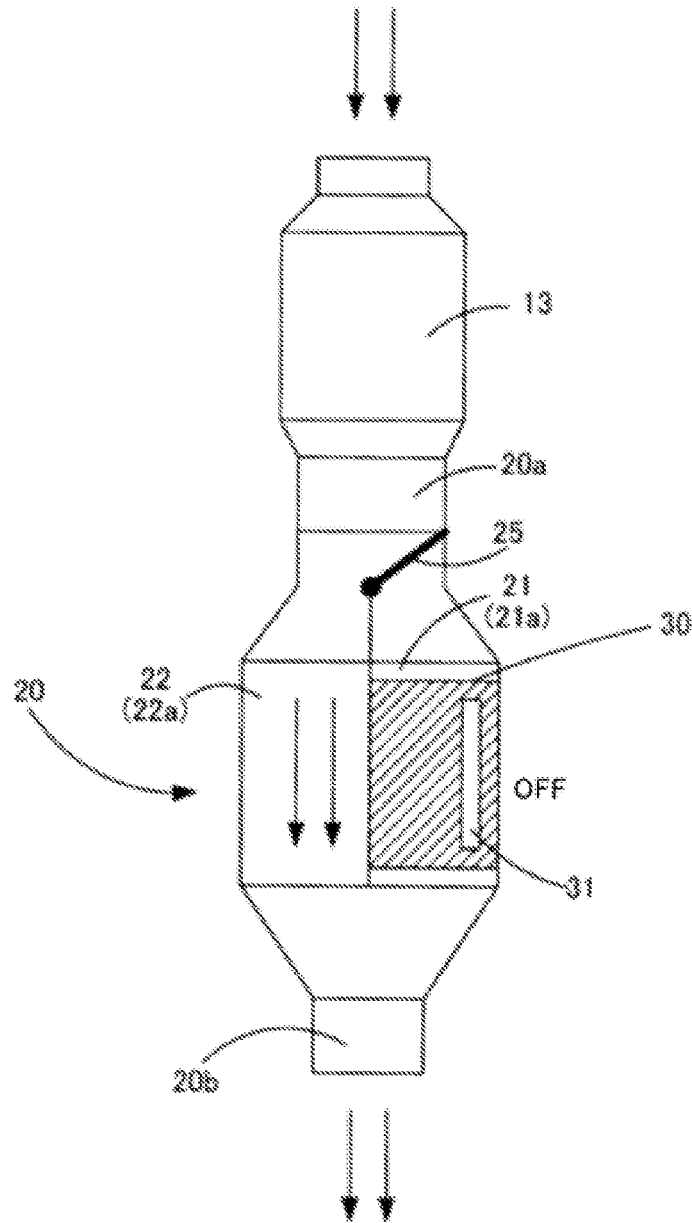
FIG. 4 is an explanatory view showing an operating state of the particulate collection apparatus according to the first embodiment at the time of steady operation.
Figure 5:
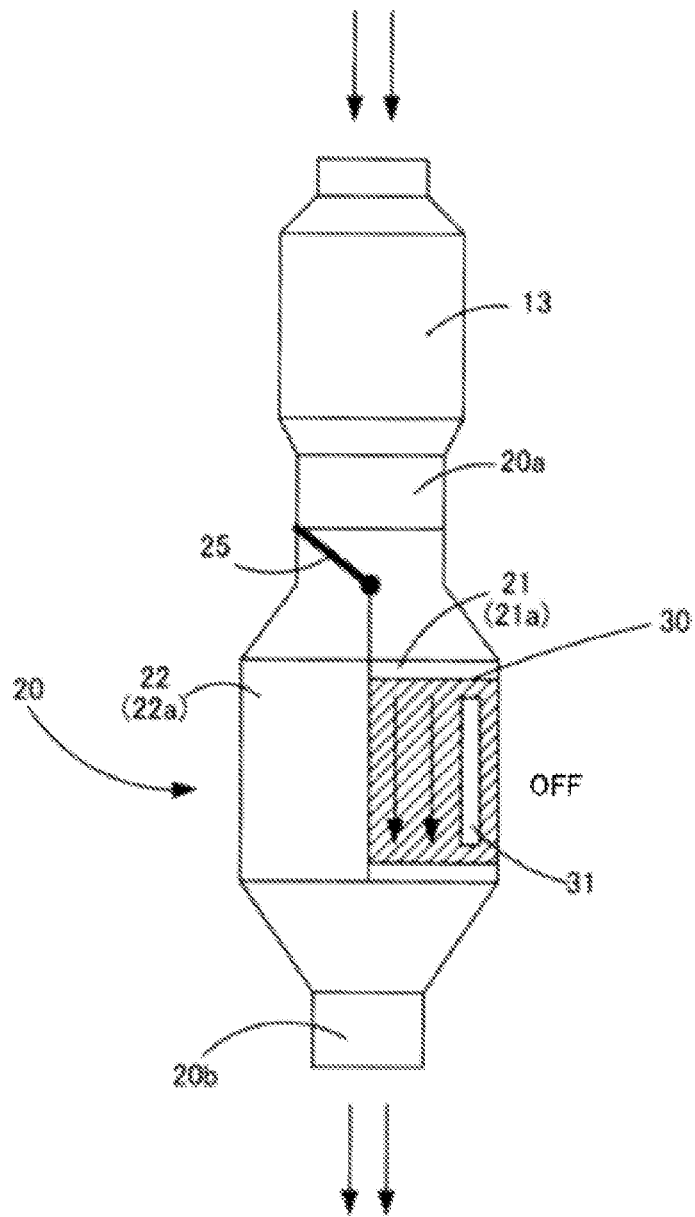
FIG. 5 is an explanatory view showing an operating state of the particulate collection apparatus according to the first embodiment at the time of acceleration.
Figure 6:
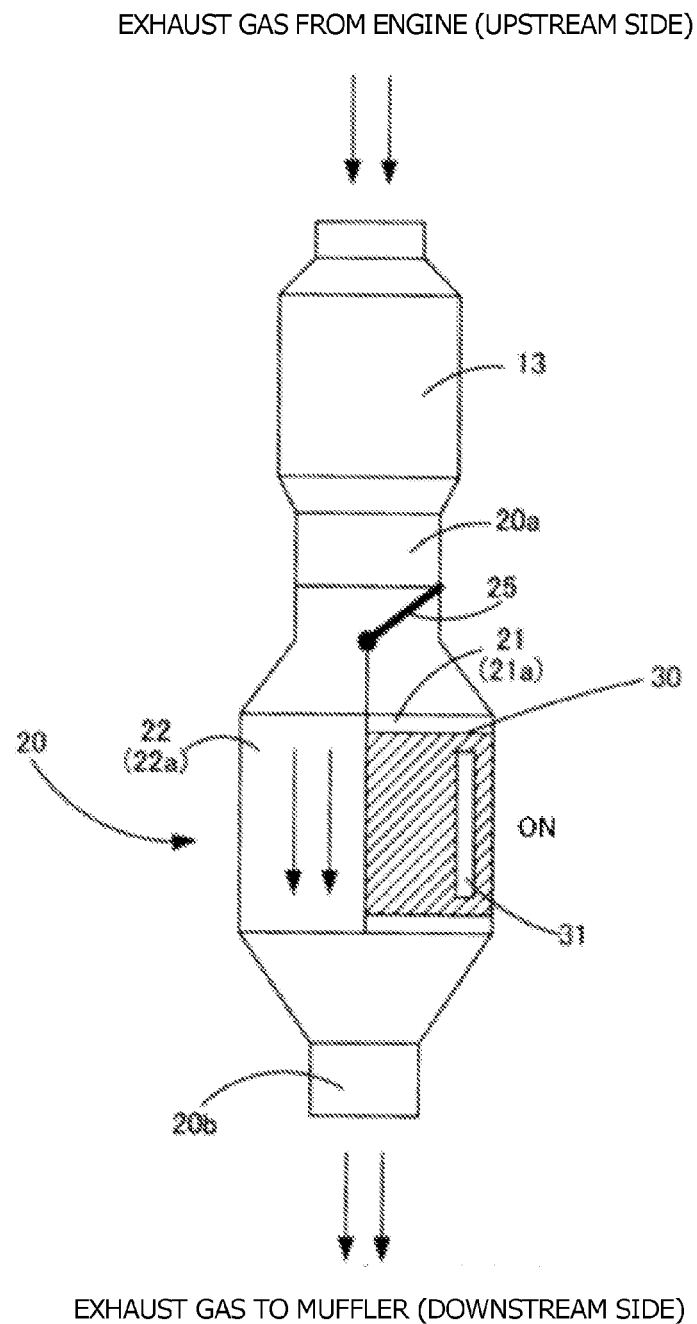
FIG. 6 is an explanatory view showing an operating state of the particulate collection apparatus according to the first embodiment at the time of deceleration.

The switching of the flow passage changeover valve 25 in accordance with the operation state of the vehicle and the heating of the heat reservoir 30 by the heating member 31; namely, the operation of the particulate collection apparatus 20 according to the first embodiment, will be described with reference to FIGS. 4 to 6. FIG. 4 is an explanatory view showing an operating state of the particulate collection apparatus according to the first embodiment at the time of steady operation. FIG. 5 is an explanatory view showing an operating state of the particulate collection apparatus according to the first embodiment at the time of acceleration. FIG. 6 is an explanatory view showing an operating state of the particulate collection apparatus according to the first embodiment at the time of deceleration.

In the particulate collection system 10 according to the first embodiment, the DPF 13 is disposed in a stage before the particulate collection apparatus 20; i.e., on the introduction opening 20a side thereof. A filter having a large hole (opening) diameter may be used as the DPF 13. In this case, relatively large particulates (PM) are collected by the filter, and smaller particulates (PM) are collected by the heat reservoir 30 having a smaller hole (opening) diameter. Alternatively, a plasma DPF may be used as the DPF 13. In the case where a filter having a large hole (opening) diameter or a plasma DPF is used as the DPF 13, the amount of particulates (PM) generated at the time of acceleration exceeds the amount of particulates (PM) which can be collected by the DPF 13. Therefore, in the first embodiment, the PM collection at the time of acceleration is assisted by the heat reservoir 30. Notably, in the present specification, the phrase "load within a predetermined range" means load in the case where the operation state of the vehicle is a steady operation state, the phrase "load above the predetermined range" means load in the case where the operation state of the vehicle is an acceleration state, and the phrase "load below the predetermined range" means load in the case where the operation state of the vehicle is a deceleration state.

In the case where the operation state of the vehicle is a steady operation state, as shown in FIG. 4, the flow passage changeover valve 25 is switched so as to close the first flow passage pipe 21 and lead the exhaust gas from the engine 510 to the second flow passage pipe 22; i.e., the second flow passage 22a. Namely, the particulates (PM) are collected by the DPF 13. At the time of steady operation, the amount of the generated particulates (PM) is smaller than that at the time of acceleration, and the generated particulates (PM) can be collected sufficiently by the PDF 13 on the upstream side. Notably, the flow passage changeover valve 25 may be switched to establish communication between the introduction opening 20a and both of the first and second flow passage pipes 21 and 22 to thereby lead the exhaust gas from the engine 510 to the first and second flow passage pipes 21 and 22; i.e., the first and second flow passages 21a and 22a. In this case, it is possible to heat the heat reservoir 30, by exposing the heat reservoir 30 to the exhaust gas introduced into the particulate collection apparatus 20, to thereby cause the heat reservoir 30 to store heat. The heat stored in the heat reservoir 30 allows the heating member 31 to quickly burn the particulates (PM) at the time of acceleration.

In the case where the operation state of the vehicle is an acceleration, as shown in FIG. 5, the flow passage changeover valve 25 is switched to close the second flow passage pipe 22 and lead the exhaust gas from the engine 510 to the first flow passage pipe 21; i.e., the first flow passage 21a. Namely, the particulates (PM) are collected by the DPF 13 and the heat reservoir 30. At the time of acceleration, the engine load increases, whereby the amounts of emitted NOx and particulates (PM) increase and the flow rate of the exhaust gas itself increases. Accordingly, all of the particulates (PM) cannot be collected by the DPF 13 on the upstream side, and uncollected particulates (PM) are collected by the heat reservoir 30. Notably, since the hole (opening) diameter of the heat reservoir 30 is smaller than the filter hole (opening) diameter of the DPF 13 as having been already described, particulates (PM) which are small in diameter and have not been collected by the DPF 13 are collected by the heat reservoir 30.

In the case where the operation state of the vehicle is a deceleration, as shown in FIG. 6, the flow passage changeover valve 25 is switched to close the first flow passage pipe 21 and lead the exhaust gas from the engine 510 to the second flow passage pipe 22; i.e., the second flow passage 22a. Namely, the heat reservoir 30 is heated by the heating member 31. As will be described later, at the time of deceleration, the vehicle according to the present embodiment can collect the kinetic energy at the time of deceleration as electrical energy through use of an alternator to thereby obtain regenerative electric power. In view of this, at the time of deceleration, the heating member 31 generates heat through use of the regenerative electric power to thereby heat the heat reservoir 30. It is desired that the heating member 31 generate an amount of heat required to convert (oxidize) the collected particulate maters. Since the heat reservoir 30 holds the particulates (PM) collected at the time acceleration, as a result of heat generation of the heating member 31, the collected particulates (PM) are converted (oxidized) to $H_2O$ and $CO_2$. As a result, the heat reservoir 30 is generated and heat is stored in the heat reservoir 30.

Figure 7:
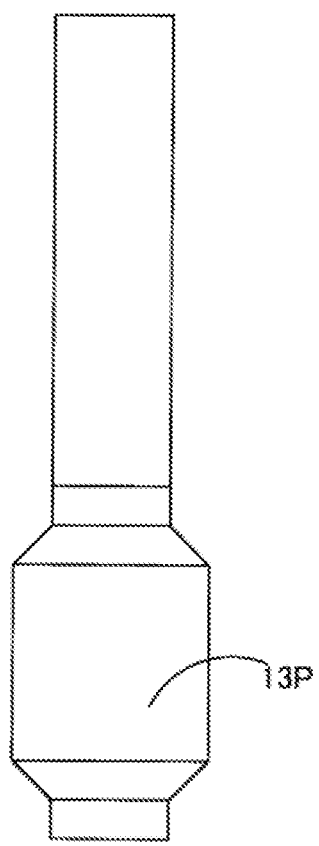
FIG. 7 is an explanatory view showing an exhaust gas purification system including a conventional DPF.

FIG. 7 is an explanatory view showing an exhaust gas purification system including a conventional DPF. In the case of a conventional DPF 13P shown in FIG. 7, small-diameter particulates (PM) are required to be collected by the DPF 13P only, and its hole (opening) diameter is small. Therefore, the DPF 13P easily reaches the PM collection capacity due to the particulates (PM) generated at the time of acceleration. Also, in the case where a plasma DPF is employed, a plasma generation unit must be designed on the basis of the amount of the particulates (PM) generated at the time of acceleration. Therefore, the conventional DPF has a large size and consumes a large amount of electric power.

Figure 8:
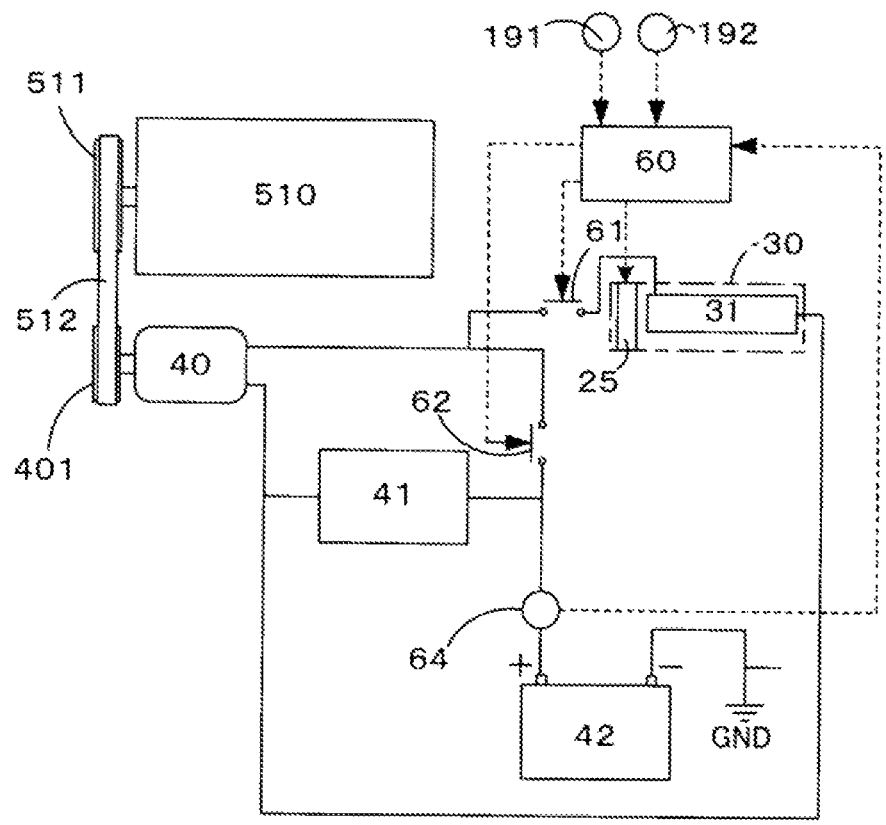
FIG. 8 is a block diagram schematically showing the electrical connections among electrical components in the vehicle having a heat reservoir according to the first embodiment.

FIG. 8 is a block diagram schematically showing the electrical connections among electrical components in the vehicle having the heat reservoir according to the first embodiment. The vehicle 500 includes an alternator (generator) 40 which is driven by the drive force of the engine 510. The engine 510 has an engine-side pulley 511 for providing to the alternator 40 the drive force (output) taken out from a crankshaft (not shown). The alternator 40 has an alternator-side pulley 401 for receiving the drive force provided from the engine 510. The engine-side pulley 511 and the alternator-side pulley 401 are mechanically connected by a belt 512, whereby the drive force of the engine 510 is transmitted to the alternator 40 through the belt 512.

The vehicle 500 includes the flow passage changeover valve 25, a vehicle accessory 41, the battery 42, a control unit 60, a first relay 61, a second relay 62, the first temperature sensor 191, and the second temperature sensor 192. The flow passage changeover valve 25, which has the above-described structure, is connected to the control unit 60 through a control signal line. The valve body of the flow passage changeover valve 25 is driven by its actuator in accordance with the control signal from the control unit 60, whereby the flow passage of the exhaust gas is switched to the first flow passage pipe 21, to the second flow passage pipe 22, or to the first and second flow passage pipes 21 and 22. The control unit 60 functions as a control section for controlling (performing and stopping) the collection of particulates (PM) at the particulate collection apparatus 20.

The control unit 60 properly and selectively performs, through switching, the collection of particulates (PM) by the DPF 13, the collection of particulates (PM) by the DPF 13 and the heat reservoir 30, and the heating of the heat reservoir 30 by the heating member 31. Notably, in the present specification, a combination of the particulate correction apparatus 20 and the control unit 60 will be referred to as the particulate collection system 10, and the apparatus itself will be referred to as the particulate correction apparatus 20. However, the term "particulate collection system 10" and the term "particulate correction apparatus 20" may be used in the same meaning.

The vehicle accessory 41 is an accessory which is used when the vehicle travels and which is driven by (consumes) the electric power output from the alternator 40 or the electric power stored in the battery 42. Examples of the vehicle accessory 41 include head lamps, an audio system, a navigation system, and an electric heater.

The output terminal of the alternator 40 is electrically connected to the heating member 31 through the first relay 61. Also, the output terminal of the alternator 40 is electrically connected to the vehicle accessory 41 through the second relay 62 and is electrically connected to the positive terminal (+) of the battery 42 through an ammeter 64. Notably, a DC/DC converter for voltage step up or voltage step down may be disposed in a wiring path extending from the alternator 40 to the vehicle accessory 41 and the battery 42. The ground-side terminals of the alternator 40, the vehicle accessory 41, and the heating member 31 are electrically connected to the negative terminal (−) of the battery 42 through the body ground.

The first relay 61 is a switch which turns the heating member 31 on and off; namely, allows and stops the supply of electric power to the heating member 31. The second relay 62 is a switch which allows and stops the supply of electric power generated by the alternator 40 to the accessory 41 and the battery 42. The first and second relays 61 and 62 are connected to the control unit 60 through control signal lines and are turned on (closed) and turned off (opened) by the control signals from the control unit 60. The ammeter 64 detects the output current of the battery 42 and provides the detected output current to the control unit 60 through a signal line. The first temperature sensor 191, which is used to detect the temperature of the particulate collection apparatus 20 (the heat reservoir 30), and the second temperature sensor 192, which is used to detect the temperature of the exhaust gas introduced into the particulate collection apparatus 20, are both connected to the control unit 60 through signal lines.

In the present embodiment, the electric power generated by the alternator 40 can be supplied to the heating member 31 directly, namely, without storing the electric power in the battery 42, by turning the first relay 61 on and turning the second relay 62 off. For example, under the condition that the battery 42 is in a prescribed fully charged state at the time of deceleration of the vehicle and the electric power output from the alternator 40 becomes excessive power, it is possible to operate the alternator 40 so as to supply electric power to the heating member 31 for heat generation. Accordingly, in the case where electric power is charged into the battery 42, the output voltage of the alternator 40 is limited to 12 V or 24 V. However, in the case where electric power is supplied directly to the heating member 31, electric power can be supplied at a voltage of 12 V to 100 V. The thermal energy generated by the heating member 31 is used to heat the heat reservoir 30, whereby the conversion (oxidation) of the particulates (PM) collected by the heat reservoir 30 is realized, and heat is stored in the heat reservoir 30. As a result, it is possible to convert the kinetic energy of the vehicle to electrical energy and then to thermal energy, without wasting the kinetic energy, to thereby execute the process of regenerating the heat reservoir 30 by oxidizing the particulates (PM) collected by the heat reservoir 30. Also, the heat stored in the heat reservoir 30 is used to increase the temperature of the exhaust gas in accordance with the operation state of the vehicle.

Figure 9:
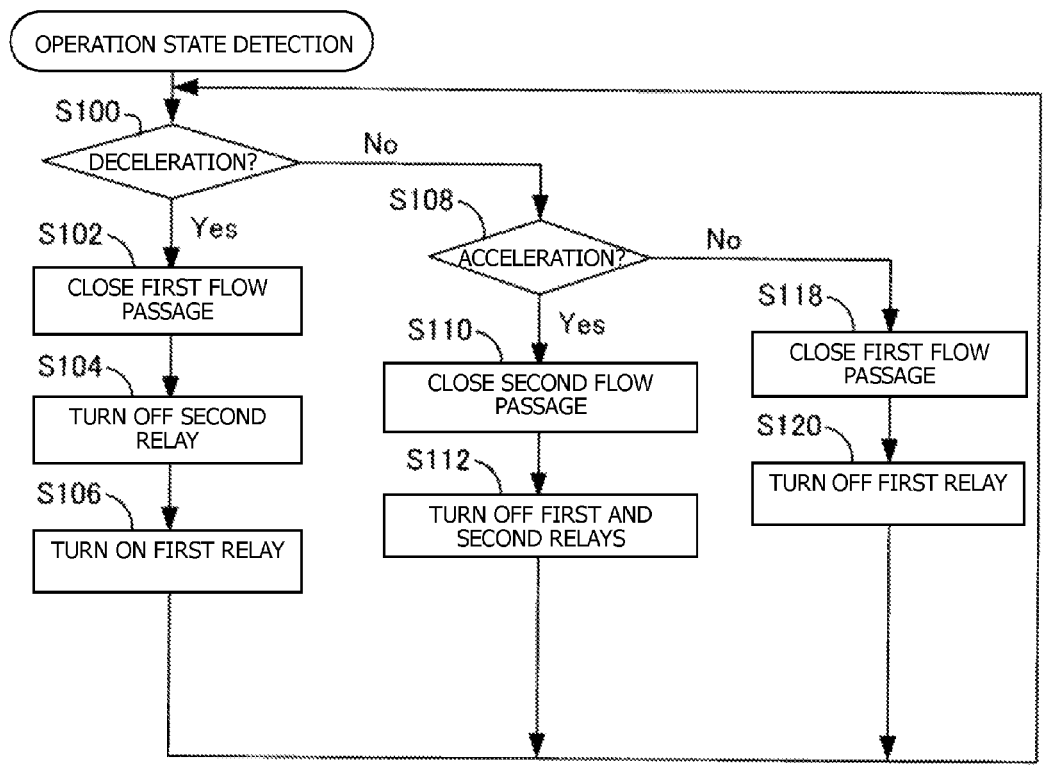
FIG. 9 is a flowchart showing a processing routine for controlling the operation of the particulate collection apparatus in the first embodiment.

Operation control for the particulate collection apparatus 20 in the first embodiment will be described with reference to FIG. 9. FIG. 9 is a flowchart showing a processing routine for controlling the operation of the particulate collection apparatus in the first embodiment. The present processing routine is executed by the control unit 60. Notably, the control unit 60 includes at least a central processing unit (CPU), memories, and an input/output interface for exchanging control signals and detection signals with external devices. The CPU, the memories, and the input/output interface are not shown in the drawings.

The control unit 60 starts the present processing routine when the vehicle is started, and detects the operation state of the vehicle using various sensors provided on the vehicle. For example, the control unit 60 can judge the operation state of the vehicle (i.e., an acceleration state, a deceleration state, or a steady operation state) on the basis of an input signal input from an accelerator pedal opening sensor and an input signal input from the temperature sensor 192 disposed on the upstream side of the particulate collection apparatus 20.

The control unit 60 judges whether or not the operation state of the vehicle is a deceleration state (step S100). In the case where the control unit 60 judges that the operation state of the vehicle is a deceleration state (step S100: Yes), the control unit 60 sends a control signal to the flow passage changeover valve 25 so as to close the first flow passage pipe 21 (the first flow passage 21a) (step S102) and establish communication between the introduction opening 20a and the second flow passage pipe 22 (the second flow passage 22a) to thereby lead the exhaust gas to the second flow passage 22a as shown in FIG. 6. Namely, the control unit 60 prevents the heat reservoir 30 from being exposed to the flow of the exhaust gas to thereby efficiently execute the process of regenerating the heat reservoir 30 by oxidizing the particulates (PM) collected by the heat reservoir 30, through use of the heating member 31 which will be described later. In the case where the input signal from the accelerator pedal opening sensor indicates that the accelerator pedal is not operated (the opening (the amount of operation of the pedal) is zero), the control unit 60 judges that the operation state of the vehicle is a deceleration state (coasting state). The control unit 60 turns off the second relay 62 (step S104), turns on the first relay 61 (step S106), and returns to the detection of the operation state. As a result of switching of the second relay 62 to the off position, the connection between the battery 42 and the alternator 40 is broken. Meanwhile, as a result of the first relay 61 being turned on, the regenerative electric power generated by the alternator 40 as a result of deceleration is supplied to the heating member 31, whereby the heating member 31 generates heat and the heat reservoir 30 is heated. The particulates (PM) collected by the heat reservoir 30 are converted (oxidized) to $H_2O$ and $CO_2$ as a result of heating by the heating member 31. As a result, the heat reservoir 30 is regenerated, and heat is stored in the heat reservoir 30.

Notably, the control unit 60 may judge whether or not the second relay 62 is in the on position before sending an off signal (opening signal) to the second relay 62 and send the off signal to the second relay 62 only when the second relay 62 is in the on position, or the control unit 60 may send the off signal to the second relay 62 irrespective of the present position of the second relay 62. This procedure is the same in the valve position switching control for the flow passage changeover valve 25 and in the on-off control for the first relay 61.

In the case where the control unit 60 judges that the operation state of the vehicle is not a deceleration state (step S100: No), the control unit 60 judges whether or not the operation state of the vehicle is an acceleration state (step S108). In the case where the control unit 60 judges that the operation state of the vehicle is an acceleration state (step S108: Yes), the control unit 60 sends a control signal to the flow passage changeover valve 25 so as to close the second flow passage pipe 22 (the second flow passage 22a) (step S110) and establish communication between the introduction opening 20a and the first flow passage pipe 21 (the first flow passage 21a) to thereby lead the exhaust gas to the first flow passage 21a as shown in FIG. 5. The control unit 60 judges that the operation state of the vehicle is an acceleration state, for example, when the opening of the accelerator pedal is equal to or greater than a predetermined angle and a change in vehicle speed per unit time is equal to or greater than a predetermined value. The control unit 60 turns off the first and second relays 61 and 62 (step S112) and returns to the detection of the operation state. As a result of switching of the first and second relays 61 and 62 to the off position, the heating member 31 is turned off (disconnected from the electric power circuit), and the connection between the battery 42 and the alternator 40 is broken. Notably, at least the second relay 62 is not required to be turned off. Also, a control of stopping the power generation by the alternator 40 at the time of acceleration may be performed. Since at the time of acceleration the flow rate of the exhaust gas increases and the amounts of PM and NOx also increase, the heat reservoir 30 is exposed to the exhaust gas so as to collect the particulates (PM) by the heat reservoir 30. Also, by the thermal energy stored in the heat reservoir 30 or the heat generated by the heating member 31 or a different heating member provided at the discharge opening 20b through use of the electric power from the battery 42, the exhaust gas is heated so as to raise the temperature of the exhaust gas discharged from the particulate collection apparatus 20 to a desired temperature. Notably, the desired temperature is, for example, a temperature within a temperature range within which the SCR unit 14 can operate properly and convert NOx to nitrogen ($N_2$) and water ($H_2O$).

In the case where the control unit 60 judges that the operation state of the vehicle is not an acceleration state (step S118: No), the control unit 60 judges that the operation state of the vehicle is a steady state and sends a control signal to the flow passage changeover valve 25 so as to close the first flow passage pipe 21 (the first flow passage 21a) (step S118) and establish communication between the introduction opening 20a and the second flow passage pipe (the second flow passage 22a) to thereby lead the exhaust gas to the second flow passage 22a as shown in FIG. 4. In the present specification, the steady state means that the operation state of the vehicle is neither a deceleration state nor an acceleration state. Notably, the steady state may be defined to exclude a cold start state and a low load state in which the load of the engine 510 is low (for example, the case where the opening of the accelerator pedal is less than a predetermined opening and the vehicle speed is approximately constant). The control unit 60 turns off the first relay 61 (step S120) and returns to the detection of the operation state. As a result of switching of the first relay 61 to the off position, the heating member 31 is turned off (disconnected from the electric power circuit). The second relay 62 may be turned on or off depending on the charging state of the battery 42. In the steady state, the flow rate of the exhaust gas is smaller than that at the time of acceleration, and the particulates (PM) can be collected sufficiently by the DPF 13.

According to the above-described particulate collection system 10 according to the first embodiment, the particulates (PM) the amount of which increases at the time of acceleration can be collected by the heat reservoir 30, which serves as a second particulate collection filter. Therefore, it is possible to reduce the amount of the particulates (PM) collected by the DPF 13, which serves as a first particulate collection filter, to thereby decrease the number of times of regeneration which is performed at the DPF 13 and which consumes fuel independently of travel. As a result, the fuel efficiency of the vehicle can be improved.

In the case where a plasma DPF is used as the DPF 13, since the amount of particulates (PM) to be collected by the DPF 13 is decreased, the size of the plasma generation unit can be reduced even when the plasma generation unit is designed in consideration of collection of the particulates (PM) which increase in amount at the time of acceleration. Also, since the amount of electric power required for plasma generation can be reduced, the energy required for the DPF processing can be reduced.

Further, regenerative electric power obtained during deceleration of the vehicle is used as electric power which is supplied to the heating member 31 when the processing of converting the particulates (PM) collected by the heat reservoir 30; i.e., the process of regenerating the heat reservoir 30, is performed. Therefore, it is unnecessary to additionally operate the internal combustion engine 510 (consume fuel) so as to obtain electric power for causing the heating member 31 to generate heat for regeneration of the heat reservoir 30. As a result, extra energy which does not relate to travel is not needed. Also, the heat reservoir 30 functions as a particulate collection filter. Therefore, in the case where heat has been stored in the heat reservoir 30 by exhaust gas which is discharged at the time of acceleration and is relatively high in temperature, the heat reservoir 30 can be heated to a required temperature within a shorter period of time as compared with the case where only an electrical heating member is used. Therefore, the time required for the regeneration processing can be shortened, and the electric power required for the regeneration processing for the heat reservoir 30 can be reduced.

As described above, the particulate collection system 10 according to the first embodiment includes the DPF 13 serving as the first particulate collection filter and the heat reservoir 30 serving as the second particulate collection filter. Therefore, the particulate collection system 10 can purify the exhaust gas efficiently. As a result, the particulate collection system 10 can purify the exhaust gas to a desired purification level without lowing the overall energy efficiency of the vehicle.

B. Second Embodiment

Figure 10:
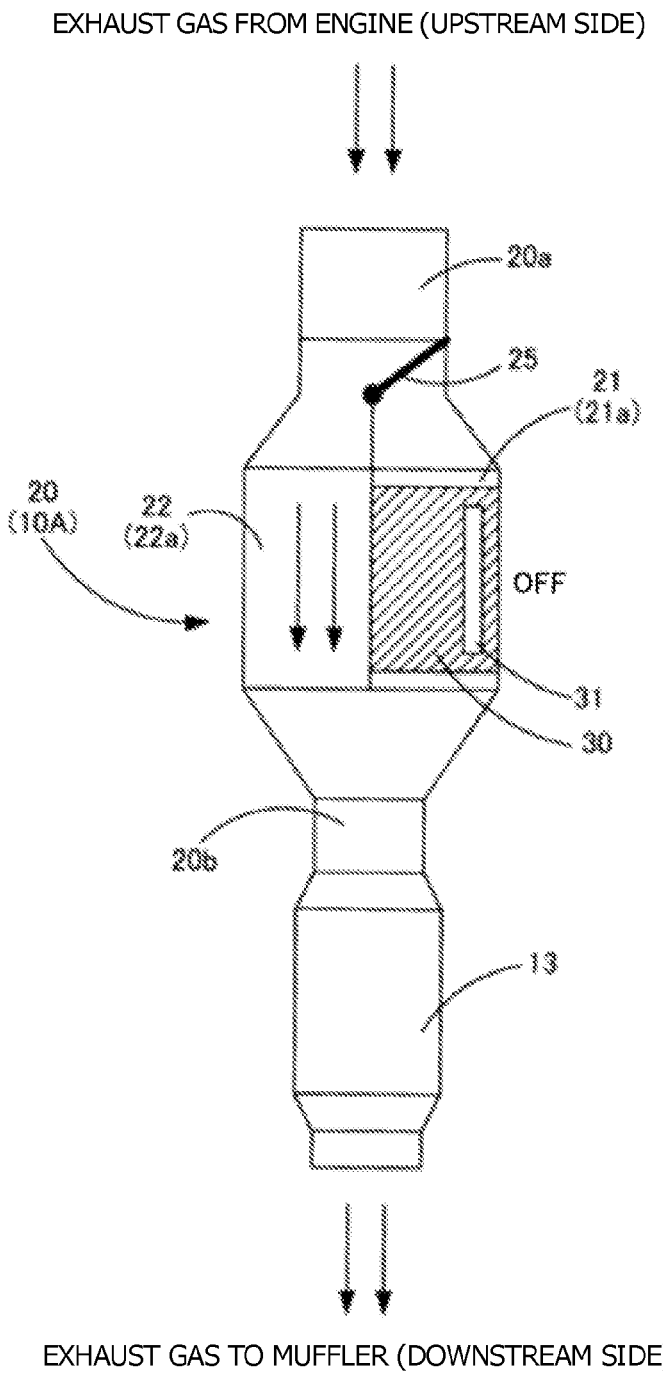
FIG. 10 is an explanatory view showing an operating state of a particulate collection apparatus according to a second embodiment in a steady state.
Figure 11:
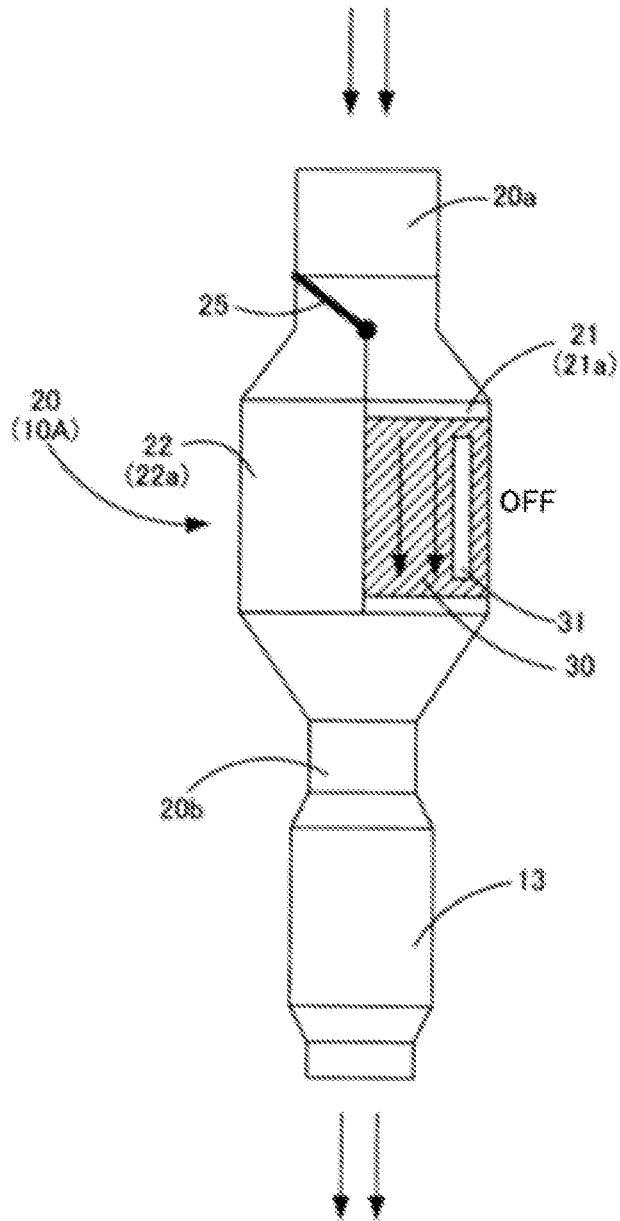
FIG. 11 is an explanatory view showing an operating state of the particulate collection apparatus according to the second embodiment at the time of acceleration.
Figure 12:
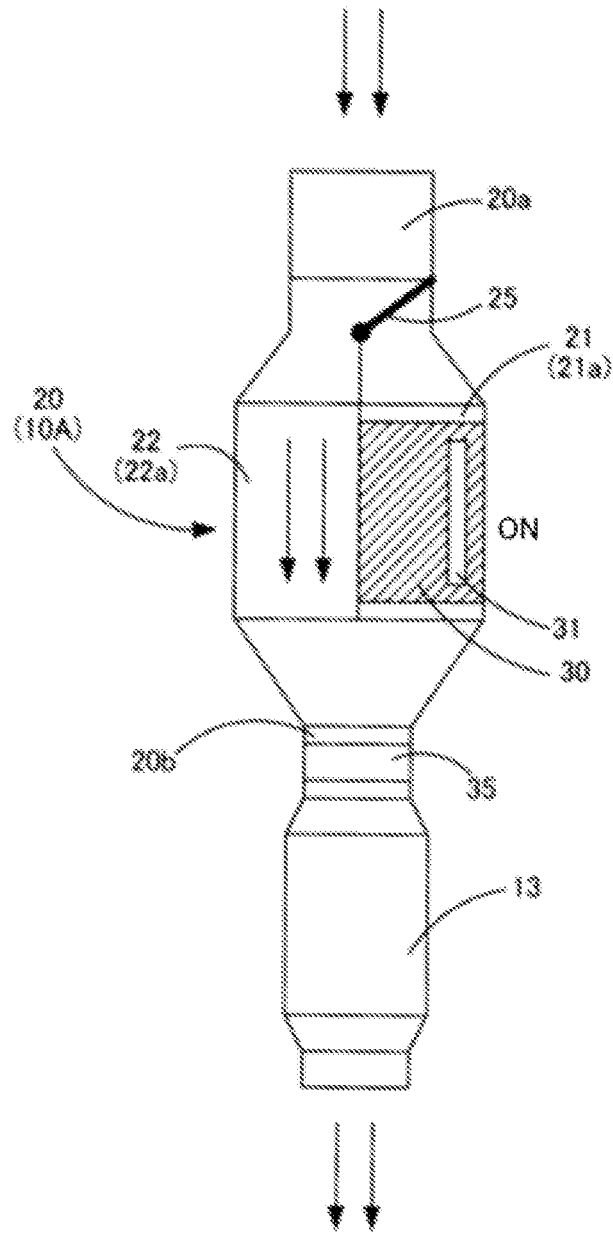
FIG. 12 is an explanatory view showing an operating state of the particulate collection apparatus according to the second embodiment at the time of deceleration.

A particulate collection apparatus 20 in a particulate collection system 10A according to a second embodiment will be described with reference to FIGS. 10 to 12. FIG. 10 is an explanatory view showing an operating state of the particulate collection apparatus according to the second embodiment in a steady state. FIG. 11 is an explanatory view showing an operating state of the particulate collection apparatus according to the second embodiment at the time of acceleration. FIG. 12 is an explanatory view showing an operating state of the particulate collection apparatus according to the second embodiment at the time of deceleration.

The particulate collection system 10A according to the second embodiment differs from the first particulate collection system 10 in the point that the DPF 13 is provided on the downstream side of (in a stage following) the particulate collection apparatus 20; namely, on the discharge opening 20b side thereof. In the second embodiment, the DPF 13 has a hole (opening) diameter equal to or smaller than that of the heat reservoir 30. Also, a plasma DPF may be used as the DPF 13. In the second embodiment, the heat reservoir 30 (the particulate collection apparatus 20) which can collect particulates (PM) is provided in a stage before the DPF 13. Therefore, even at the time of acceleration, the amount of particulates (PM) to be collected by the DPF 13 is not large. Therefore, the amount of particulates (PM) to be collected at the time of acceleration is not required to be taken into consideration when the DPF 13 is designed.

In the case where the vehicle is in a steady state shown in FIG. 10, the flow passage changeover valve 25 is switched so as to close the first flow passage pipe 21 and lead the exhaust gas from the engine 510 to the second flow passage 22a. Namely, the particulates (PM) are collected by the DPF 13. At the time of steady operation, the amount of the generated particulates (PM) is smaller than that at the time of acceleration, and the generated particulates (PM) can be collected sufficiently by the DPF 13 on the downstream side. Notably, at the time of steady operation, the flow passage changeover valve 25 may be switched to establish communication between the introduction opening 20a and the first and second flow passage pipes 21 and 22 to thereby lead the exhaust gas from the engine 510 to the first and second flow passages 21a and 22a.

In the case where the vehicle is in an acceleration state shown in FIG. 11, the flow passage changeover valve 25 is switched so as to close the second flow passage pipe 22 and lead the exhaust gas from the engine 510 to the first flow passage pipe 21; i.e., the first flow passage 21a. Namely, the particulates (PM) are collected by the DPF 13 and the heat reservoir 30. At the time of acceleration, the engine load increases, whereby the amounts of emitted NOx and particulates (PM) increase, and the flow rate of the exhaust gas itself increases. Accordingly, the heat reservoir 30 collects an amount of particulates (PM) corresponding to the amount of particulates (PM) which will not be collected by the DPF 13 on the downstream side. Notably, since the filter hole (opening) diameter of the DPF 13 is equal to or smaller than the hole (opening) diameter of the heat reservoir 30 as having been described already, the particulates (PM) which were not collected by the heat reservoir 30 are collected by the DPF 13.

In the case where the vehicle is in a deceleration state shown in FIG. 12, the flow passage changeover valve 25 is switched so as to close the first flow passage pipe 21 and lead the exhaust gas from the engine 510 to the second flow passage 22a. Namely, the heat reservoir 30 is heated by the heating member 31. At the time of deceleration, the heating member 31 generates heat using the regenerative electric power obtained as a result of deceleration and heat the heat reservoir 30. The particulates (PM) collected by the heat reservoir 30 during acceleration are converted (oxidized) to $H_2O$ and $CO_2$ by the heat generated by the heating member 31. As a result, the heat reservoir 30 is regenerated and heat is stored in the heat reservoir 30.

The above-described particulate collection system 10A according to the second embodiment has the following advantage in addition to the advantage of the first embodiment because the particulate collection apparatus 20 is disposed in a stage before the DPF 13. Specifically, it is possibly to additionally apply the particulate collection apparatus 20 to a conventional DPF to thereby decrease the number of times of regeneration of the DPF. Namely, exhaust gas is supplied directly to the heat reservoir 30, which serves as the second particulate collection filter, without through the DPF 13. Therefore, it is possible to collect particulates (PM) at the heat reservoir 30 without adjusting the hole (opening) diameter of the DPF 13.

Also, in the particulate collection system 10A according to the second embodiment, the particulate collection apparatus 20 is disposed in a stage before the DPF 13. Therefore, the temperature of the exhaust gas introduced into the DPF 13 can be maintained at a high temperature, and it is expected that spontaneous regeneration is performed periodically without performance of forced regeneration involving fuel injection. As a result, no fuel is consumed for the regeneration process, whereby the fuel efficiency of the vehicle can be improved.

Figure 13:
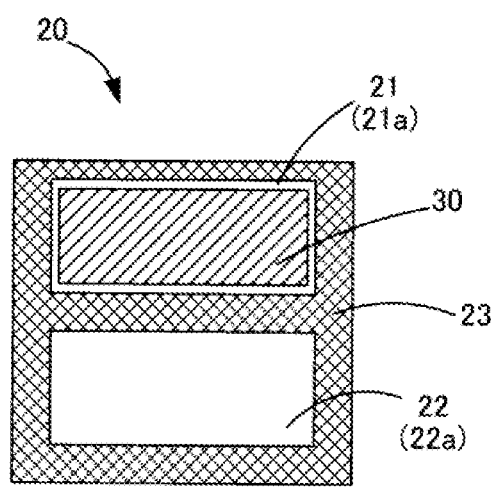
FIG. 13 is an explanatory view showing a modification of the particulate collection apparatus according to the first embodiment.

C. Modifications (1) Although the particulate collection apparatus 20 according to the first embodiment shown in FIGS. 2 and 3 has the first flow passage pipe 21 and the second flow passage pipe 22 which are arranged in parallel in the horizontal direction, the particulate collection apparatus 20 may have a first flow passage pipe 21 and a second flow passage pipe 22 which are arranged in parallel in the vertical direction as shown in FIG. 13. FIG. 13 is an explanatory view showing a modification of the particulate collection apparatus according to the first embodiment. For example, in the case where a mounting space extending in the horizontal direction does not exist and a mounting space extending in the vertical direction can be found, the particulate collection apparatus 20 according to the first embodiment can be mounted on the vehicle (in the mounting space extending in the vertical direction).

(2) In the above-described embodiments, the temperature of the heat reservoir 30 and the temperature of the exhaust gas are obtained by the first temperature sensor 191 provided on the heat reservoir 30 and the second temperature sensor 192 provided upstream of the heat reservoir 30. However, these temperatures may be equally obtained on the basis of the time elapsed after the startup of the engine 510 or on the basis of the record of energization of the heating member 31.

(3) Since the particulate collection apparatus 20 according to the above-described embodiments is provided upstream of the SCR unit 14, exhaust gas having a temperature suitable for NOx purification can be steadily supplied to the SCR unit 14. As a result, at the SCR unit 14, NOx purification can be performed under a condition under which NOx purification cannot be conventionally performed due to a decrease in the temperature of the exhaust gas, whereby the amount of NOx emitted to the atmosphere can be reduced further. Also, the processing of raising the exhaust gas temperature by fuel combustion, which has been conventionally performed at the DOC 12 or the DPF 13 in order to raise the exhaust gas temperature, becomes unnecessary, whereby the amount of fuel consumed independently of travel can be reduced.

(4) The term "purification unit" used in the present specification encompasses not only a so-called chemical-reaction-type purification catalyst which converts a particular component (substance) contained in exhaust gas to a harmless component (substance) using a catalyst, but also a filter-type purification unit which traps the particular component contained in exhaust gas. Even a filter-type purification unit may have a proper temperature range for properly performing its regeneration operation. Since the particulate collection apparatus 20 according to the above-described embodiments can maintain the temperature of the exhaust gas introduced into the filter-type purification unit to fall within the proper temperature range, the filter-type purification unit can exhibit expected performance under a wide range of conditions irrespective of the operation state of the engine 510. Accordingly, the particulate collection apparatus 20 according to the above-described embodiments may be disposed upstream of any purification unit so long as the purification unit exhibits expected performance as a result of introduction of exhaust gas within a predetermined temperature range, and as a result of being disposed upstream of such a purification unit, the particulate collection apparatus 20 allows the purification unit to exhibit its performance under a wide range of conditions.

(5) In the above-described embodiments, a single heat reservoir 30 is used. However, the heat reservoir 30 may be composed of a plurality of independent heat reservoirs. In this case, it is expected that the temperature distribution of exhaust gas within the heat reservoir 30 becomes uniform as a result of dispersion and mixing of exhaust gas temperatures among the heat reservoirs 30. Also, in the above-described embodiments, the particulate collection apparatus 20 uses the heat reservoir 30 as the second particulate collection filter. However, a particulate collection filter of a certain structure and/or a certain material which does not have heat storage/radiation performance or is low in the heat storage/radiation performance and which is generally not used as a heat reservoir may be used in place of the heat reservoir 30.

(6) In the above-described embodiments, the particulate collection apparatus 20 has the shape of a rectangular box. However, the particulate collection apparatus 20 may have a redundant shape which has a plurality of folds between the introduction opening 20a and the discharge opening 20b, or may have a cylindrical shape. Also, in the above-described embodiments, the particulate collection apparatus 20 extends straight. However, the particulate collection apparatus 20 may be applied to a purification system in which a portion of the structure or pipe is disposed to extend in a direction intersecting with the remaining portion of the structure or pipe and which is formed into a folded shape. For example, the particulate collection apparatus 20 may be applied to a purification system which has a folded shape and which includes a parallel portion which becomes parallel to the ground surface when the system is mounted on a vehicle and an intersecting portion which intersects with the parallel portion, whereby the length in the flow direction of exhaust gas is shortened. Notably, the purification system may be a purification system in which the intersecting portion is a vertical portion perpendicular to the ground surface and which has a larger size in the vertical direction. In this case, the particulate collection apparatus 20 may be disposed in the parallel portion or the intersecting portion.

(7) In the above-described embodiments, as shown in FIG. 12, a second heating member 35 may be provided at the discharge opening 20b of the particulate collection apparatus 20. In the first embodiment, the temperature of the SCR unit 14 provided in the stage after the particulate collection apparatus 20 can be raised to and maintained at a proper operating temperature by raising the temperature of the discharged exhaust gas by the second heating member. In the second embodiment, it becomes possible to supply exhaust gas of higher temperature to the DPF 13, and further, it is expected that spontaneous regeneration is performed periodically without performance of forced regeneration involving fuel injection.

(8) In the above-described embodiments, descriptions have been given by taking the diesel engine 510 as an example. However, the particulate collection apparatus 20 according to the above-described embodiments may be disposed in an exhaust gas passage of a gasoline engine and constitute an exhaust gas purification system for the gasoline engine. A direct-injection-type gasoline engine which injects fuel directly into each combustion chamber may generate particulates (PM). Such particulates (PM) can be removed by disposing the particulate collection apparatus 20 in a stage before a three-way catalyst. Also, quick warming up of the three-way catalyst can be realized by heating exhaust gas through use of heat stored in the heat reservoir 30. Accordingly, in the case where the particulate collection apparatus 20 according to the above-described embodiments is applied, the quick warming up can be realized irrespective of the position of the three-way catalyst, and the degree of freedom of vehicle design can be increased.

Although the present invention has been described on the basis of embodiments and modifications thereof, the above-described embodiments of the invention are provided so as to facilitate understanding of the present invention and do not limit the present invention. The present invention can be modified or improved without departing from the spirit of the invention and the scopes of the claims, and the present invention encompasses equivalents thereof. For example, in order to solve, partially or entirely, the above-mentioned problem or yield, partially or entirely, the above-mentioned effects, technical features of the embodiments and modifications corresponding to technical features of the modes described in the section "Summary of the Invention" can be replaced or combined as appropriate. Also, the technical feature(s) may be eliminated as appropriate unless the present specification mentions that the technical feature(s) is essential.

DESCRIPTION OF REFERENCE NUMERALS

10: particulate collection system
10A: particulate collection system
11: exhaust pipe
11a: manifold
11b: muffler end pipe
12: diesel oxidation catalyst
13: diesel particulate filter
14: selective catalytic reduction unit
15: diesel oxidation catalyst
17: fuel injection unit
18: urea water injection unit
191: first temperature sensor
192: second temperature sensor
20: particulate collection apparatus
20a: introduction opening
20b: discharge opening
201: casing
21: first flow passage pipe
21a: first flow passage
22: second flow passage pipe 22a: second flow passage
23: heat insulating material
25: flow passage changeover valve
30: heat reservoir
31: heating member
35: second heating member
40: alternator
401: alternator-side pulley
41: accessory
42: battery
500: vehicle
510: diesel engine
511: engine-side pulley
512: belt
520: wheel
60: control unit
61: first relay
62: second relay
64: ammeter

What is claimed:

1. A particulate collection system for collecting particulates contained in exhaust gas discharged from an internal combustion engine, the particulate collection system comprising:
a first particulate collection filter;
a second particulate collection filter;
a heating member for heating the second particulate collection filter;
a control section configured to selectively execute collection of particulates by the first particulate collection filter, collection of particulates by the first particulate collection filter and the second particulate collection filter, and heating of the second particulate collection filter by the heating member;
a first flow passage for the exhaust gas, the first flow passage containing the second particulate collection filter and the heating member; and
a second flow passage for the exhaust gas which differs from the first flow passage;
wherein the heating member is a resistance heating member which generates heat when electricity is supplied thereto; and
a changeover section configured to be in a first position to lead the exhaust gas exclusively to first flow passage, configured to be in a second position to lead the exhaust gas exclusively to the second flow passage, and configured to be in a third position to lead the exhaust gas to both the first flow passage and the second flow passage.

2. A particulate collection system according to claim 1, wherein the heating member generates heat using electric power obtained through regeneration and regenerates the second particulate collection filter.

3. A particulate collection system according to claim 1, wherein the particulate collection system is disposed in a stage before an exhaust gas purification unit disposed in an exhaust pipe passage of the internal combustion engine.

4. A particulate collection system according to claim 3, wherein the exhaust gas purification unit is a selective catalytic reduction unit, a three-way catalyst, or an oxidation catalyst.

5. A particulate collection system according to claim 1, wherein
the first particulate collection filter is disposed in a stage before or after the first flow passage and the second flow passage, and
the control section selectively executes the collection of particulates by the first particulate collection filter, the collection of particulates by the first particulate collection filter and the second particulate collection filter, and the heating of the second particulate collection filter by the heating member by controlling the changeover section.

6. A particulate collection system according to claim 5, wherein, when a load of the internal combustion engine is above a predetermined range, the control section switches the changeover section to lead the exhaust gas to the first flow passage, and, when the load of the internal combustion engine is below the predetermined range, the control section switches the changeover section to lead the exhaust gas to the second flow passage and causes the heating member to generate heat.

7. A particulate collection system according to claim 6, wherein, when the load of the internal combustion engine is within the predetermined range, the control section switches the changeover section to lead the exhaust gas to the second flow passage.

8. A particulate collection apparatus disposed in an exhaust pipe passage of an internal combustion engine, the particulate collection apparatus comprising:
an introduction opening for introducing exhaust gas from the internal combustion engine;
a discharge opening for discharging the introduced exhaust gas;
a first particulate collection filter disposed at the introduction opening or the discharge opening;
a first flow passage establishing communication between the introduction opening and the discharge opening;
a second particulate collection filter disposed in the first flow passage, the second particulate collection filter capable of storing or radiating heat;
a heating member disposed in the first flow passage;
a second flow passage which differs from the first flow passage, the second flow passage establishing communication between the introduction opening and the discharge opening; and
a changeover section configured to be in a first position to lead the exhaust gas exclusively to first flow passage, configured to be in a second position to lead the exhaust gas exclusively to the second flow passage, and configured to be in a third position to lead the exhaust gas to both the first flow passage and the second flow passage;
wherein the heating member is a resistance heating member which generates heat when electricity is supplied thereto.

9. A particulate collection apparatus according to claim 8, wherein the heating member and the second particulate collection filter are integrally formed.

10. A particulate collection apparatus according to claim 8, further comprising a second heating member disposed at the discharge opening.

* * * * *